(12) United States Patent
Maucher et al.

(10) Patent No.: US 9,616,874 B2
(45) Date of Patent: Apr. 11, 2017

(54) METHOD FOR CHECKING AN ISOLATION VALVE AND MONITORING DEVICE FOR AN ISOLATION VALVE

(71) Applicant: Robert Bosch GmbH, Stuttgart (DE)

(72) Inventors: Thorsten Maucher, Heidelberg (DE); Tobias Leng, Stuttgart (DE); Stefan Strengert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/651,034

(22) PCT Filed: Oct. 22, 2013

(86) PCT No.: PCT/EP2013/072082
§ 371 (c)(1),
(2) Date: Jun. 10, 2015

(87) PCT Pub. No.: WO2014/095127
PCT Pub. Date: Jun. 26, 2014

(65) Prior Publication Data
US 2016/0304074 A1  Oct. 20, 2016

(30) Foreign Application Priority Data
Dec. 19, 2012 (DE) .......................... 10 2012 223 714

(51) Int. Cl.
*G01M 17/00* (2006.01)
*B60T 13/16* (2006.01)
(Continued)

(52) U.S. Cl.
CPC .......... *B60T 17/221* (2013.01); *B60T 8/4072* (2013.01); *B60T 8/4872* (2013.01); *B60T 8/88* (2013.01); *B60T 17/18* (2013.01)

(58) Field of Classification Search
USPC ....................... 701/33.9; 303/10; 251/129.01
See application file for complete search history.

(56) References Cited

U.S. PATENT DOCUMENTS

| | | | | |
|---|---|---|---|---|
| 4,859,001 A | * | 8/1989 | Parker | B60T 8/94 303/115.4 |
| 2001/0034574 A1 | * | 10/2001 | Tanaka | B60T 8/4036 701/70 |

(Continued)

FOREIGN PATENT DOCUMENTS

| | | |
|---|---|---|
| CN | 101909956 A | 12/2010 |
| CN | 102686459 A | 9/2012 |

(Continued)

OTHER PUBLICATIONS

International Search Report for PCT/EP2013/072082, dated Jan. 23, 2014.

*Primary Examiner* — Tyler Paige
(74) *Attorney, Agent, or Firm* — Gerard Messina

(57) ABSTRACT

A method for checking an isolation valve of a braking system of a vehicle includes the steps of: operating at least one pump of a brake circuit of the braking system which is hydraulically connected via the isolation valve to a brake master cylinder of the braking system for a predefined pump running time; measuring at least one value regarding a pressure present in the brake circuit; and determining, in consideration of the at least one measured value, whether the isolation valve is mechanically blocked.

19 Claims, 4 Drawing Sheets

(51) Int. Cl.
    *F16K 31/02*     (2006.01)
    *B60T 17/22*     (2006.01)
    *B60T 8/40*     (2006.01)
    *B60T 8/48*     (2006.01)
    *B60T 8/88*     (2006.01)
    *B60T 17/18*     (2006.01)

(56) References Cited

U.S. PATENT DOCUMENTS

| | | | | |
|---|---|---|---|---|
| 2002/0047304 | A1* | 4/2002 | Bolitho | B60T 8/363 |
| | | | | 303/119.2 |
| 2002/0084691 | A1* | 7/2002 | Isono | B60T 8/4081 |
| | | | | 303/10 |
| 2005/0110337 | A1* | 5/2005 | Zheng | B60T 8/326 |
| | | | | 303/10 |
| 2005/0231033 | A1* | 10/2005 | Ganzel | B60T 8/4081 |
| | | | | 303/152 |
| 2012/0126610 | A1* | 5/2012 | Nakata | B60T 1/10 |
| | | | | 303/9.63 |
| 2012/0298895 | A1* | 11/2012 | Zula | B60T 8/3255 |
| | | | | 251/129.01 |
| 2015/0224972 | A1* | 8/2015 | Feigel | B60T 8/4081 |
| | | | | 303/15 |

FOREIGN PATENT DOCUMENTS

| | | |
|---|---|---|
| DE | 41 06 336 | 9/1992 |
| DE | 10 2005 056939 | 6/2006 |
| DE | 10 2011 005822 | 9/2012 |
| EP | 0 841 231 | 5/1998 |
| JP | 2002 347601 | 12/2002 |

\* cited by examiner

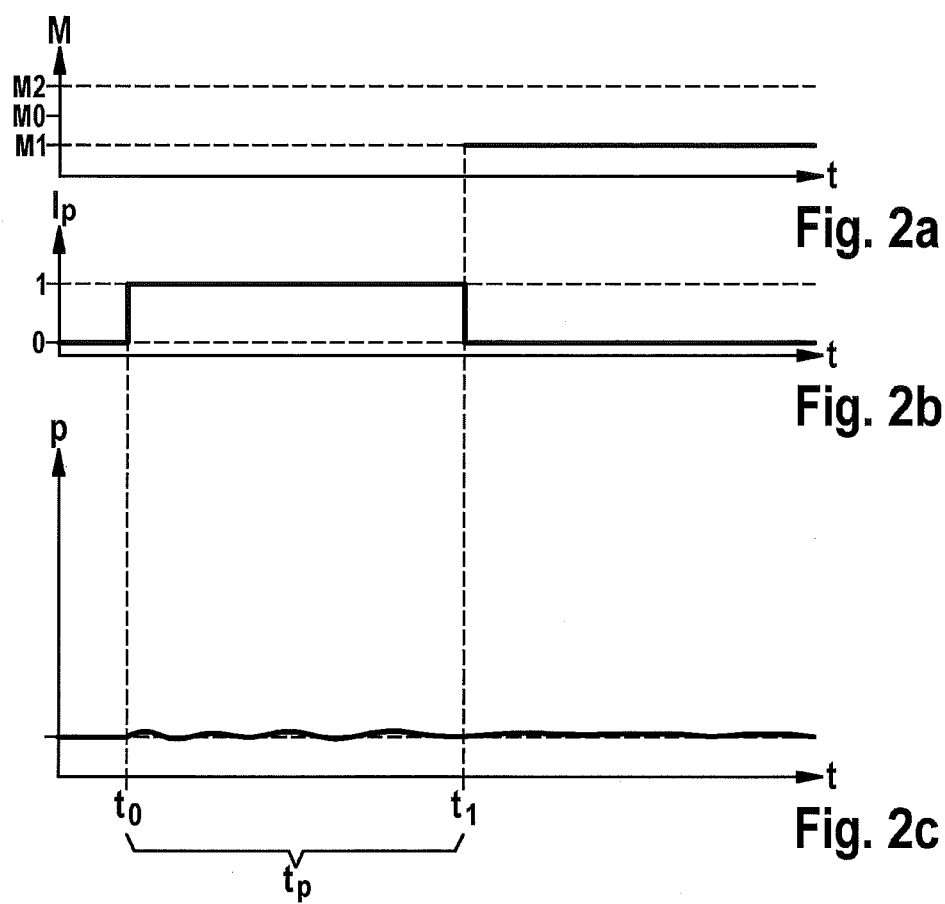

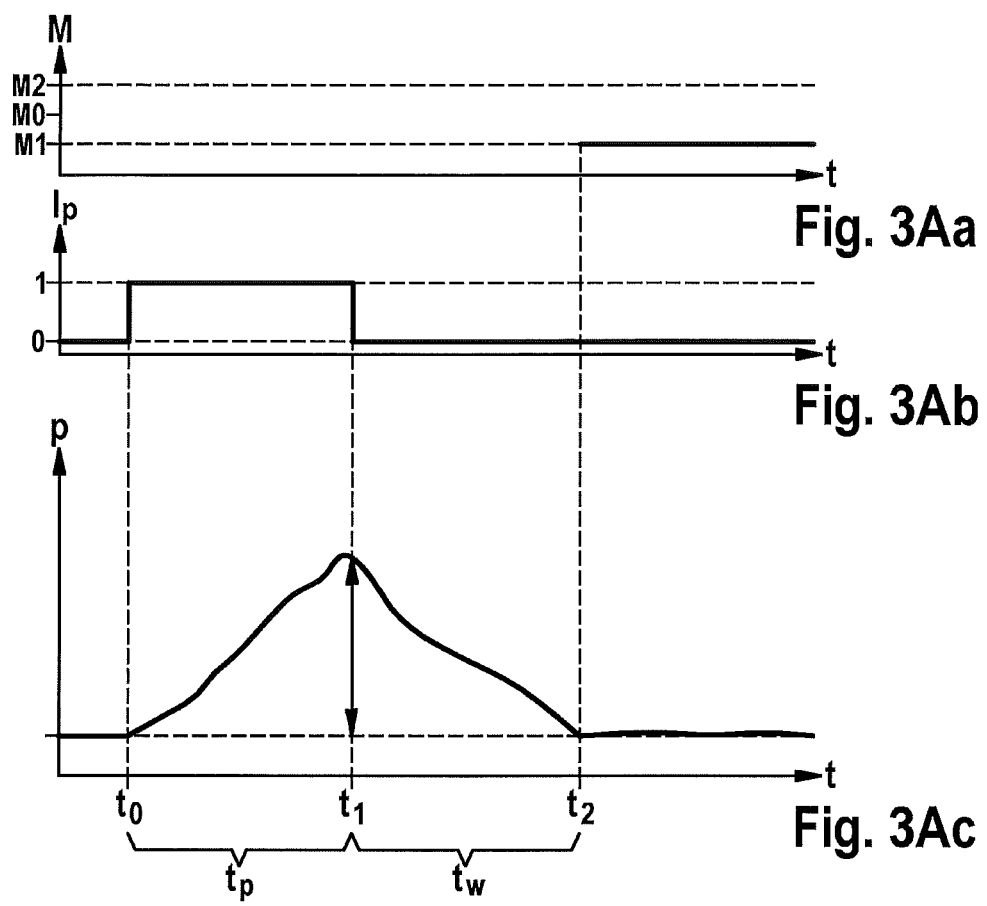

METHOD FOR CHECKING AN ISOLATION VALVE AND MONITORING DEVICE FOR AN ISOLATION VALVE

BACKGROUND OF THE INVENTION

1. Field of the Invention

The invention relates to a method for checking an isolation valve of a braking system of a vehicle. The invention further relates to a monitoring apparatus for an isolation valve of a braking system of a vehicle.

2. Description of the Related Art

Published German patent application document DE 10 2011 005 822 A1 describes braking systems and methods for operating the braking systems. The braking systems encompass a decouplable brake circuit that is connected via an isolation valve to a brake master cylinder of the respective braking system.

BRIEF SUMMARY OF THE INVENTION

The present invention provides a method for checking an isolation valve of a braking system of a vehicle, a monitoring system for an isolation valve of a braking system of a vehicle, an ESP system for a braking system of a vehicle, a braking dynamics regulating system for a braking system of a vehicle, and a braking system for a vehicle.

The invention makes possible reliable detection of a mechanical blockage of (at least) one isolation valve of a braking system of a vehicle. By way of the subject matter according to the present invention it is possible to detect reliably whether the checked/monitored isolation valve is erroneously closed despite being controlled into an at least partly opened state.

Because it is reliably possible to detect, by way of the present invention, whether or not the checked/monitored isolation valve is mechanically blocked, undesired brake circuit failures of the brake circuit connected via the isolation valve to the brake master cylinder due to a blockage of the isolation valve can be prevented. In particular, thanks to the check according to the present invention of the isolation valve it is possible to ensure that after the isolation valve has been controlled into an at least partly opened state, the driver can reliably apply braking into the brake circuit connected via the open isolation valve to the brake master cylinder.

The present invention can be used to check normally open isolation valves and normally closed isolation valves. It is noted that the usability of the present invention is not limited to a specific type of checkable isolation valve.

Braking systems having at least one isolation valve by way of which at least one brake circuit is hydraulically connected to the brake master cylinder are often used for interaction with at least one generator. The latter serves to implement a regenerative braking system having a blending function, such that closure of the at least one isolation valve can selectably prevent the driver from applying braking into the at least one brake circuit connected via the at least one isolation valve to the brake master cylinder. A braking system of this kind can also be referred to as a "brake by wire" system. (The at least one electric motor usable as a generator can also be utilized as an electric drive motor. The at least one electric motor can likewise be a separate electrical machine.)

The braking action of at least one wheel brake cylinder which is absent due to the decoupling of the at least one brake circuit thanks to the closure of the at least one isolation valve can be used for utilization of the at least one generator without exceeding a deceleration of the vehicle which is specified by the driver. An advantageously high regeneration efficiency is thereby achievable. If the at least one generator is no longer usable for decelerating the vehicle because a vehicle speed is too low or because a battery is completely charged, a brake pressure can be actively built up in the at least one decoupled brake circuit. The deceleration of the vehicle specified by the driver can thus reliably be maintained even in such a situation. This is also referred to as "blending" of the time-varying generator braking torque of the at least one generator. Closure of the at least one isolation valve in order to decouple the driver from the at least one brake circuit also makes it possible to ensure that the driver experiences no feedback at all from blending during an actuation of the brake actuation element.

The present invention is advantageously suitable for checking at least one isolation valve of a regenerative braking system. The invention thus contributes to stimulating a driver to use a braking system equipped with at least one generator, and thus to reduce his or her fuel consumption and pollutant emissions while driving.

In an advantageous embodiment of the method, a predefined waiting time is observed between operating the at least one pump for the pump running time and measuring the at least one measured value. Dynamic pressure effects can thereby be distinguished from a mechanically blocked isolation valve. This reliably ensures that the presence of a mechanically blocked isolation valve is determined only if such is actually the case.

In a further advantageous embodiment the at least one measured value is compared with at least one predefined maximum target value and, if the at least one measured value is above the at least one predefined maximum target value, a determination is made that the isolation valve is mechanically blocked. A method step that is simple to execute can thus be used to identify a mechanical blockage of the isolation valve. An economical electronic system that requires comparatively little installation space can therefore be used to execute the method step.

In a further advantageous refinement, the waiting time and/or the at least one maximum target value are predefined in consideration of an ascertained or estimated brake fluid temperature, an ascertained or estimated ambient temperature, and/or an ascertained or estimated pressure change within a time span preceding a check of the isolation valve. A dynamic pressure logic can thus be taken into consideration in executing the method.

Preferably a current speed of the vehicle is ascertained or estimated, the check of the isolation valve being performed only if the current speed is at least in a range between 1 km/h and 30 km/h. Preferably the check of the isolation valve is carried out only if the current speed is at least in a range between 5 km/h and 20 km/h. It is thus possible to ensure reliably that a pressure buildup effected by a check of the isolation valve in the context of a mechanical blockage thereof exists only at a low vehicle speed.

As an alternative or supplement thereto, a displacement travel of a brake actuation element of the vehicle from its initial position and/or an actuation intensity of an actuation of the brake actuation element of the vehicle can be ascertained or estimated, the check of the isolation valve being performed only if the displacement travel and/or actuation intensity are equal to zero. Checking of the isolation valve thus occurs only during non-actuation of the brake actuation element by a driver. This therefore reliably ensures that during checking of the isolation valve, the brake master cylinder is hydraulically connected via the breather orifices to the brake fluid reservoir.

In an advantageous embodiment, the check of the isolation valve is repeated once a predefined time span, a predefined number of braking actions, or a predefined number of ignition cycles has elapsed. A cyclic check of the isolation valve which can be ensured in this manner allows a quick reaction to a possible mechanical blockage of the isolation valve.

As an alternative or supplement thereto, the check of the isolation valve can also be performed if a residual pressure is ascertained in the brake circuit despite a passive braking system. Indications of a possibly present mechanical blockage of the isolation valve can thus be reacted to quickly. By reliably detecting that the mechanical blockage actually exists, it is possible to ensure rapid remediation.

In addition, the check of the non-blocked isolation valve can eliminate an unnecessary repair shop visit due only to the ascertained residual pressure in a context of a passive braking system.

The advantages set forth above are also ensured in the context of a monitoring apparatus of this kind for an isolation valve of a braking system of a vehicle.

The advantages can furthermore be achieved by an ESP system for a braking system of a vehicle, or a braking dynamics regulating system for a braking system of a vehicle, having a monitoring apparatus of this kind.

A braking system for a vehicle having a corresponding monitoring apparatus also permits the aforementioned advantages to be realized.

BRIEF DESCRIPTION OF THE DRAWINGS

FIGS. 2a to 2c show coordinate systems to explain a first embodiment of the method for checking an isolation valve of a braking system of a vehicle.

DETAILED DESCRIPTION OF THE INVENTION

Figure 1:
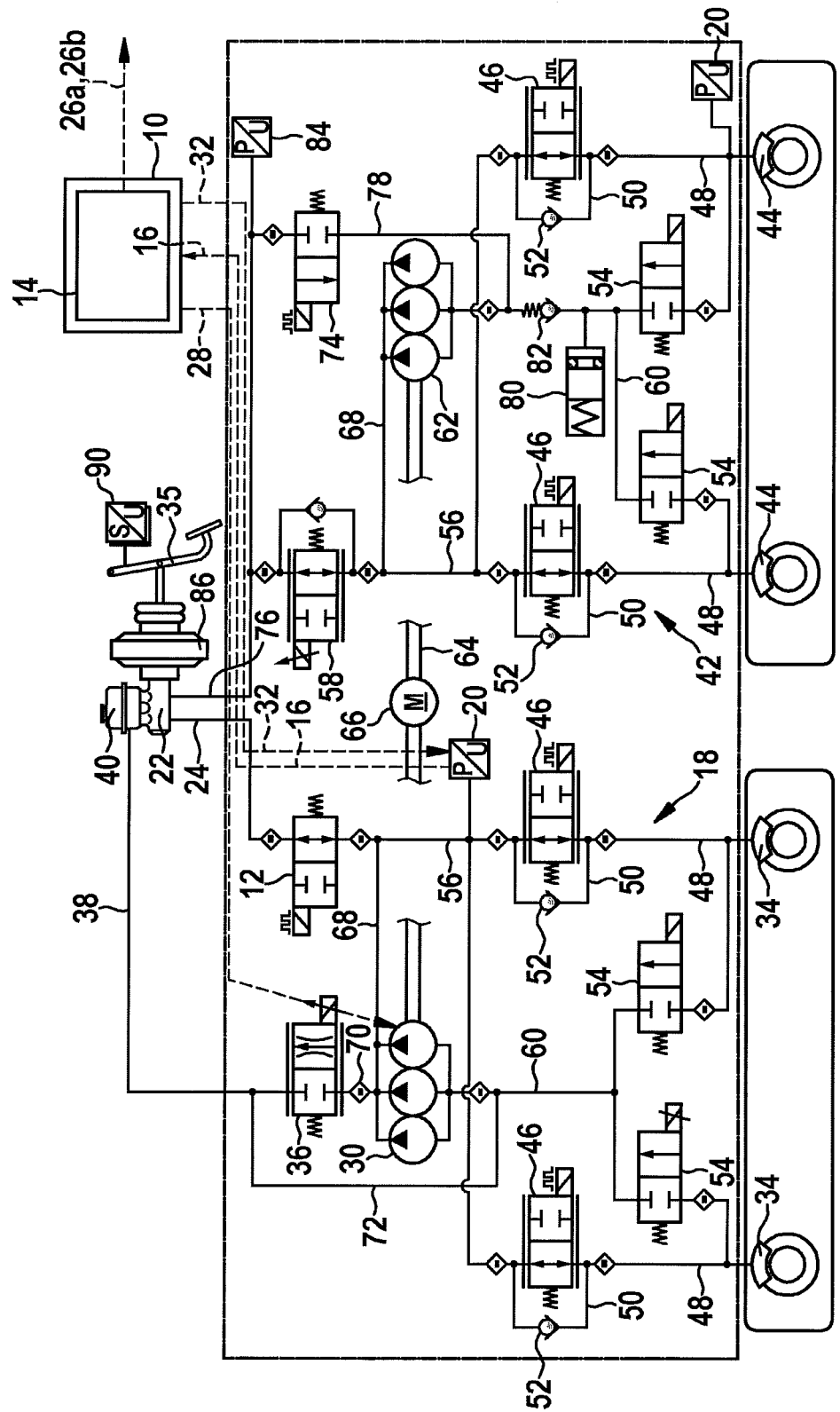
FIG. 1 schematically depicts an embodiment of the monitoring apparatus.

FIG. 1 schematically depicts an embodiment of the monitoring apparatus.

Monitoring apparatus 10 depicted schematically in FIG. 1 is designed for checking at least one isolation valve 12 of a braking system of a vehicle. Multiple isolation valves 12 of the braking system can also be checkable using monitoring apparatus 10. The description below of the manner of operation of monitoring apparatus 10 for checking only the one isolation valve 12 is to be interpreted merely as an example.

Monitoring apparatus 10 can be embodied as a compact physical unit. Monitoring apparatus 10 can also, however, be integrated into another device, for example into an ESP system or into a braking dynamics regulating system.

The at least one checkable isolation valve 12 can be designed as a normally open valve or as a normally closed valve. The usability of monitoring apparatus 10 for a normally open isolation valve 12 is associated with the advantage that it is thus also possible to check a valve that, even in the event of a breakdown of the vehicle network, still enables the driver to build up brake pressure by way of driver braking force. The depiction of isolation valve 12 in FIG. 1 as a normally open valve is to be understood, however, merely as an example. A normally closed isolation valve 12 can also be controlled into an at least partly opened state by way of a suitable valve control signal during the check performed by way of monitoring apparatus 10. Monitoring apparatus 10 can thus be used for a plurality of different types of isolation valves 12.

Monitoring apparatus 10 has an electronic device 14 that is designed to determine, in consideration of at least one furnished measured signal 16 regarding a pressure present in a first brake circuit 18 of the braking system, whether isolation valve 12 is mechanically blocked. The at least one measured signal 16 can be furnished to electronic device 14, for example, by an external sensor 20, such as in particular a circuit pressure sensor 20 connected to first brake circuit 18. As an alternative or supplement thereto, the at least one measured signal 16 can also be outputted to electronic device 14 from an internal sensor 20 that is a sub-unit of monitoring apparatus 10.

First brake circuit 18 is hydraulically connected via isolation valve 12 to a brake master cylinder 22 of the braking system. For example, a (first) delivery line 24 extends between brake master cylinder 22 and isolation valve 12. The connection depicted in FIG. 1 of first brake circuit 18 to brake master cylinder 22 via (first) delivery line 24 is to be interpreted, however, merely as an example.

The at least one measured signal 16 can, for example, exactly indicate a value of the pressure present in first brake circuit 18. The at least one measured signal 16 can, however, also encompass other variables that correspond to the pressure present in first brake circuit 18.

Once a mechanical blockage of isolation valve 12 has been identified, electronic device 14 is designed to output at least one control signal 26a and/or at least one fault report signal 26b. For example, by way of at least one control signal 26a outputted by electronic device 14, control can be applied to at least one electronic control component of the braking system in such a way that as a reaction to the at least one control signal 26a, all the pump operations at least in first brake circuit 18, in particular in all brake circuits 18 and 42 of the braking system, can be suppressed. It is thereby reliably possible to prevent the mechanical blockage of isolation valve 12 from resulting in an undesired buildup of pressure in first brake circuit 18. Control can likewise be applied by way of the at least one control signal 26a to at least one component of the braking system in order to dissipate the pressure present in first brake circuit 18. As an alternative or supplement, a warning lamp, an image display, and/or an acoustic output apparatus can also be activatable by the at least one control signal 26a/fault report signal 26b in order to inform the driver as to the existence of the defect in isolation valve 12 by way of a light signal, a displayed image, and/or an acoustic signal. In addition, a radio signal can be transmitted to a repair shop by way of the at least one control signal 26a/fault report signal 26b.

Monitoring apparatus 10 thus ensures prompt and reliable detection of a mechanical blockage of isolation valve 12. A mechanical blockage of isolation valve 12 which may possibly be present can thus be reacted to quickly. It is thereby possible to ensure that the driver, if he or she does not receive a fault notification, can rely on the existence of a capability for applying braking directly into first brake circuit 18 via the open isolation valve 12. Because braking systems having an isolation valve 12 are often used to "blend in" a time-varying generator braking torque, monitoring apparatus 10 stimulates a driver to use an energy-saving and low-emission regenerative braking system.

In an advantageous embodiment, a pump control signal 28 is outputtable by way of electronic device 14 to at least one pump 30 of first brake circuit 18/at least one motor 66 associated with the at least one pump, the at least one pump 30 being activatable for a predefined pump running time by way of said signal. Activation of the at least one pump 30 can also occur, however, via an external pump control apparatus that additionally outputs a corresponding notification signal to monitoring apparatus 10. A sensor control signal 32, by which control can be applied to the at least one sensor 20 in order to measure the at least one measured signal 16, can furthermore be outputtable to the at least one sensor 20 by way of electronic device 14. Control can, however, also be applied to the at least one sensor 20 by way of a further external control unit.

Electronic device 14 can moreover be additionally designed to compare the at least one measured signal with at least one predefined maximum target value and, if the at least one measured signal is above the at least one predefined maximum target value, to determine that isolation valve 12 is mechanically blocked. Otherwise electronic device 14 can be designed to determine that no mechanical blockage exists at isolation valve 12. (In this case as well, a corresponding information signal can be outputtable by way of electronic device 14.) It is thus sufficient to design electronic device 14 to perform simple comparison algorithms. Monitoring apparatus 10 can thus be manufactured economically and with a small installation space requirement.

In an advantageous refinement, electronic device 14 is additionally designed to observe a predefined waiting time between the pump running time and the outputting of the at least one sensor control signal 32. It is thereby possible to prevent dynamic pressures within first brake circuit 18 from erroneously being interpreted as a mechanical blockage of isolation valve 12.

Electronic device 14 can furthermore be designed to define the waiting time and/or the at least one maximum target value in consideration of a furnished or estimated brake fluid temperature, a furnished or estimated ambient temperature, and/or a furnished or estimated pressure change within a time span preceding a check of isolation valve 12. The brake fluid temperature, ambient temperature, and/or pressure change can be furnished to electronic device 14, for example, by at least one further external and/or internal sensor (not depicted). The data enumerated here make possible an estimate of a probable magnitude of dynamic pressures. It is thus advantageous to consider these data when defining the waiting time and/or the at least one maximum target value.

Electronic device 14 can furthermore be designed to perform a check of isolation valve 14 only if a furnished or estimated speed of the vehicle is at least in a range between 1 km/h and 30 km/h, preferably in a range between 5 km/h and 20 km/h. A brake pressure buildup in at least one wheel brake cylinder 34 of first brake circuit 18, triggered in the context of a mechanical blockage of isolation valve 12 by operation of the at least one first pump 30, thus cannot result in a sudden deceleration of a vehicle traveling at high speed. The speed of the vehicle can be furnished to electronic device 14 by an external and/or internal sensor (not depicted), or can be estimated by electronic device 14.

As an alternative or supplement thereto, an information item regarding a stable vehicle state can also be furnishable to electronic device 14. Electronic device 14 is optionally designed to perform the check of isolation valve 12 only if it obtains/receives the corresponding information item.

It is also advantageous if, as a result of the design of electronic device 14, the check of isolation valve 12 can be performed only if an ascertained displacement travel of a brake actuation element 35 of the vehicle from its initial position and/or an actuation intensity of an actuation of brake actuation element 35 by the driver of the vehicle are equal to zero. It is thereby possible to ensure that the check of isolation valve 12 is performed only during a non-actuation of brake actuation element 35. A hydraulic connection via the breather orifices between brake master cylinder 22 and brake fluid reservoir 40 during the check of isolation valve 12 is thus reliably ensured. The ascertained displacement travel of brake actuation element 35 and/or the actuation intensity of the actuation of brake actuation element 35 by the driver can be furnished to electronic device 14 by way of an external and/or internal sensor, for example by way of brake actuation element sensor 90 described below.

Monitoring apparatus 10 can be designed to repeat the check of isolation valve 12 once a predefined time span, a predefined number of braking actions, or a predefined number of ignition cycles have elapsed. Cyclic checking of isolation valve 12 allows sufficient test coverage to be achieved.

As an alternative or supplement thereto, the check of isolation valve 12 by monitoring apparatus 10 can also be activated if a residual pressure is ascertained in first brake circuit 18 despite a passive braking system. Thanks to a situation-dependent triggering of the check of isolation valve 12, an (undesired) residual pressure in first brake circuit 18 despite a passive braking system can thus be followed up as a relatively reliable indication of a blocked isolation valve 12. Additional performance of the check of the isolation valve by way of monitoring apparatus 10 also allows a reliable distinction to be made between an offset of the at least one sensor 20 and a mechanical blockage of isolation valve 12.

Different triggering conditions for the check of isolation valve 12 are thus possible. These triggering conditions can also be combined.

The embodiment that is described below of the braking system interacting with monitoring apparatus 10 is to be understood merely as an example:

For example, first brake circuit 18 has a pressure release valve 36 that is connected on the output side, via a suction line 38, to a brake fluid reservoir 40. Pressure release valve 20 can be a continuously settable/continuously controllable valve. The "brake fluid reservoir" 40 can be understood as a volume in which atmospheric pressure is present and/or which is connected via at least one exchange orifice, for example a breather orifice, to brake master cylinder 22.

First brake circuit 18 can have two wheel brake cylinders 34. Optionally, the braking system can also have a second brake circuit 42 having two further wheel brake cylinders 44. For example, the two wheel brake cylinders 34 of first brake circuit 18 can be associated with a common axle, in particular the rear axle, of the vehicle. In this case the two wheel brake cylinders 44 of second brake circuit 42 are associated with the front axle of the vehicle. The braking system depicted in FIG. 1 is not limited, however, so such an association of wheel brake cylinders 34 and 44.

In the braking system of FIG. 1, each wheel brake cylinder 34 and 44 has associated with it a wheel inlet valve 46 that is connected thereto via a respective line 48. A bypass line 50 having a check valve 52 extends parallel to each wheel inlet valve 46. A respective wheel outlet valve 54 is also associated, by way of a forking of the respective line 48, with each wheel brake cylinder 34 and 44.

In an embodiment of brake circuits 18 and 42 for attaching two respective wheel brake cylinders 34 or 44, the two wheel inlet valves 46 of a brake circuit 34 or 42 can be connected, each via a branching line 56, to isolation valve 12 or to a switchover valve 58 of second brake circuit 42. The two wheel outlet valves 54 of a brake circuit 18 or 42 can likewise be connected via a branching line 60 to a side of first pump 30 of first brake circuit 18 or to a second pump 62 of second brake circuit 42. The two pumps 30 and 62 can be disposed on a common shaft 64 of a motor 66. A respective line 68 that terminates in the associated line 56 can proceed from the delivery sides of pumps 30 and 62.

The delivery side of first pump 30 of first brake circuit 18 can furthermore be connected via a further line 70 to the input side of pressure release valve 36. The intake side of first pump 30 of first brake circuit 18 can additionally be connected to intake line 38 via a further line 72 extending parallel to pressure release valve 36.

Second brake circuit 42 can furthermore have a high-pressure switching valve 74 that, together with switchover valve 58, is connected via a (second) delivery line 76 to brake master cylinder 22. A further line 78 that terminates in line 60 can extend from the output side of high-pressure switching valve 74. Second brake circuit 42 can furthermore also have a reservoir chamber 80 that is connected between the two wheel outlet valves 54 of second brake circuit 42 and a termination point of line 78 on line 60. Optionally, an overpressure valve 82 can also be introduced between the termination point of line 78/second pump 62 and reservoir chamber 80.

Each of the two brake circuits 18 and 42 can be equipped with a circuit pressure sensor 20. Optionally, second brake circuit 42 can also have an inlet pressure sensor 84. The range of embodiment of the hydraulic braking system is not limited, however, to being equipped with sensors 20 and 84 depicted in FIG. 1.

The braking system of FIG. 1 also has a brake booster 86 that is disposed between a brake actuation element 35 embodied as a brake pedal and brake master cylinder 22. The braking system furthermore also has a brake actuation element sensor 90 by way of which a displacement travel of brake actuation element 35 from its initial position and/or an actuation intensity of an actuation of brake actuation element 35 can be ascertained/measured. Brake actuation element sensor 90 can be, for example, a driver braking force sensor, a driver braking pressure sensor, and/or a brake actuation travel sensor, such as in particular a rod travel sensor. The range of embodiment of brake actuation element sensor 90 is not limited, however, to the sensor types enumerated here. Equipping the hydraulic braking system with brake booster 86 and/or brake actuation element sensor 90 is likewise optional. The utilization capability of monitoring apparatus 10 is furthermore not limited to a direct connection of brake actuation element 35 to brake master cylinder 22.

It is noted once again that the usability of monitoring apparatus 10 is not limited to the braking system depicted in FIG. 1. Monitoring apparatus 10 can furthermore be designed to execute at least some method steps of the methods described below.

The advantages set forth above are also ensured in the context of a braking system for a vehicle having monitoring apparatus 10.

FIGS. 2a to 2c show coordinate systems to explain a first embodiment of the method for checking an isolation valve of a braking system of a vehicle.

The method described hereinafter can be executed, for example, by way of the monitoring apparatus described above. The implementability of the method is not limited, however, to the use of the monitoring apparatus.

The abscissas of the coordinate systems of FIGS. 2a to 2c are the time axis t. The ordinate of the coordinate system of FIG. 2a indicates a measured value M. The ordinate of the coordinate system of FIG. 2b reproduces a normalized pump control signal Ip for applying control to at least one pump of the brake circuit that is hydraulically connected, via the isolation valve to be checked, to a brake master cylinder. A pressure p present in the brake circuit is depicted by the ordinate of the coordinate system of FIG. 2c.

Multiple isolation valves of the braking system, which can be designed as normally open valves and/or as normally closed valves, can also be checked using the method described below. Normally closed isolation valves can also be controlled during execution of the method into an at least partly opened state, in particular into the completely closed state, by way of at least one suitable valve control signal. The description below of the method for checking only the one isolation valve is to be interpreted merely as an example.

In a method step of the method, the at least one pump of the brake circuit of the braking system, which is hydraulically connected via the isolation valve (that is to be tested) to the brake master cylinder of the braking system, is operated for a predefined pump running time tp. For this, a pump control signal Ip not equal to zero is delivered to the at least one pump between the times t0 and t1 (i.e. for the pump running time tp). It is thereby possible, for example, to apply control to the at least one pump in order to pump brake fluid out of a brake fluid reservoir into the brake circuit. Connection of the at least one pump to the brake fluid reservoir is not, however, a prerequisite for the implementability of the method. For example, the pump can also have control applied to it in order to pump brake fluid out of a reservoir volume internal to the circuit, for example a reservoir chamber, into the brake circuit.

After the time t1, at least one measured value M regarding the pressure p present in the brake circuit is measured. (Between the time t0 and the measurement time, the isolation valve is in an at least partly opened state, preferably in the completely opened state. If it is not automatically guaranteed that the isolation valve is in the at least partly opened state, this can be ensured by controlling the isolation valve into the at least partly opened state by way of a suitable control signal.)

The at least one measured value M is, for example, the circuit pressure p. It is noted, however, that the range of implementability of the method is not limited to a measured value M of this kind.

A determination is then made, in consideration of the at least one measured value M, as to whether the isolation valve is mechanically blocked. For this, for example, the at least one measured value M is compared with at least one predefined maximum target value M0. If the at least one measured value M is greater than the at least one predefined maximum target value M0, a determination is made that the isolation valve is mechanically blocked. Otherwise a mechanical blockage of the isolation valve can be excluded.

In the embodiment of FIGS. 2a to 2c, it is apparent from the depicted pressure p/measured value M that despite operation of the at least one pump (at least at a low rotation speed), a rise in the pressure/circuit pressure p is (almost)

suppressed because the isolation valve is reliably in an at least partly opened state. The measured value M measured after the time t1 is, at the value M1, appreciably below the maximum target value M0. It can thus be determined reliably that the volume delivered by the pump can flow off through the at least partly open isolation valve and the brake master cylinder back into the brake fluid reservoir. A mechanical blockage of the isolation valve can thus reliably be excluded.

FIGS. 3Aa to 3Bc show coordinate systems to explain a second embodiment of the method for checking an isolation valve of a braking system of a vehicle. The abscissas of the coordinate systems of FIGS. 3Aa to 3Bc are the time axis t. The ordinates of the coordinate systems of FIGS. 3Aa and 3Ba indicate the measured value M. The ordinates of the coordinate systems of FIGS. 3Ab and 3Bb reproduce a normalized pump control signal Ip for applying control to the at least one pump of the brake circuit having the isolation valve to be checked. A pressure p respectively present in the brake circuit is depicted by way of the ordinates of the coordinate systems of FIGS. 3Ac and 3Bc.

As a supplement to the embodiment described previously, in the method explained here a predefined waiting time tw is observed between operation of the at least one pump for the pump running time tp and measurement of the at least one measured value M at/as of the time t2. The method thus takes into consideration the fact that despite an open isolation valve, dynamic pressures can occur during a displacement of volumes by way of the at least one pump. These dynamic pressures are measurable as a brief elevation of the pressure/circuit pressure p.

By observing the waiting time tw before measuring the at least one measured value M, however, it is possible to reliably distinguish between a dynamic-pressure effect and a mechanically blocked isolation valve. In the example of FIGS. 3Aa to 3Ac, a dynamic-pressure effect is present but it has disappeared after the waiting time tw. The measured value M ascertained as of the time t2 thus once again has the value M1.

Figure 3B:
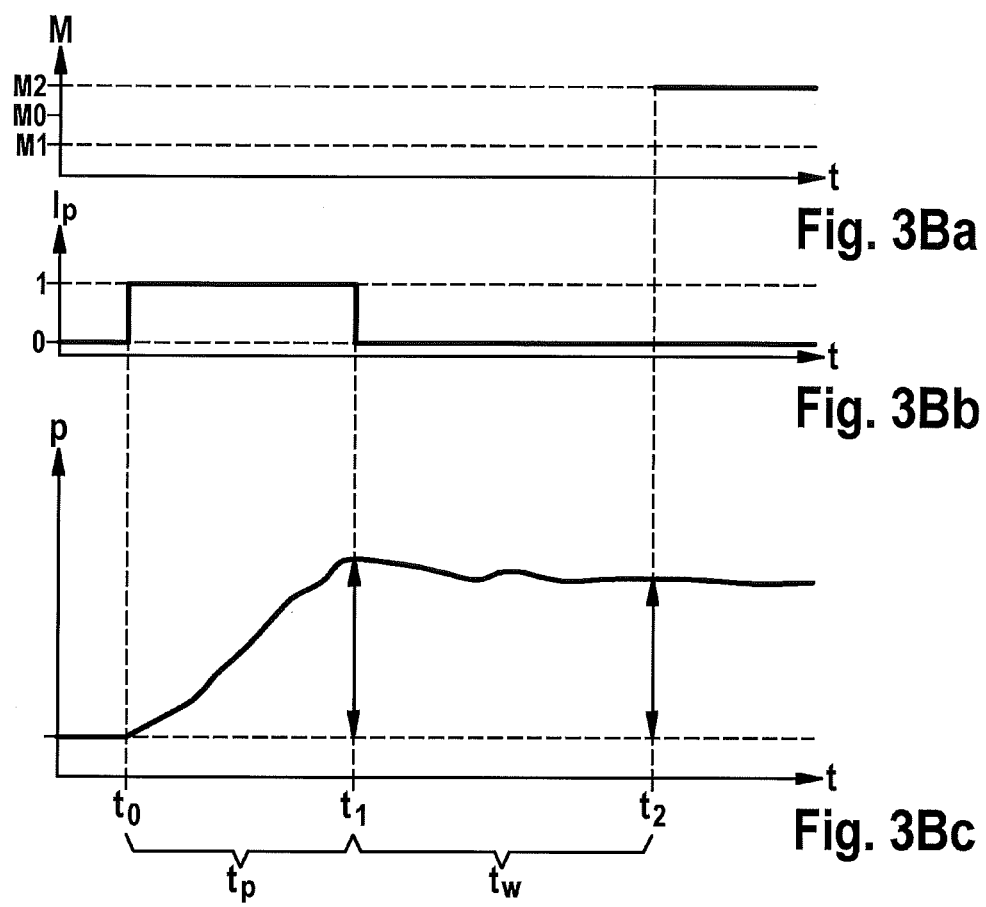
FIGS. 3Aa to 3Bc show coordinate systems to explain a second embodiment of the method for checking an isolation valve of a braking system of a vehicle.

In the example of FIGS. 3Ba to 3Bc, conversely, the pressure/circuit pressure p is still at an elevated level even after the waiting time tw. This is evident from the fact that the value M2, which is above the predefined maximum target value M0, is measured for the at least one measured value M. It can be concluded therefrom that the brake fluid delivered by the at least one pump is being prevented from flowing off via the isolation valve into the brake master cylinder due to a blockage of the isolation valve. In the example of FIGS. 3Ba to 3Bc, a dynamic-pressure effect can thus be reliably excluded. Monitoring can thus be made appreciably more robust by observing the waiting time tw.

In a refinement of the method, the waiting time tw can be predefined in consideration of an ascertained or estimated brake fluid temperature, an ascertained or estimated ambient temperature, and/or an ascertained or estimated pressure change within a time span preceding a check of the isolation valve. It is thus possible to reliably take into consideration the fact that the viscosity of brake fluids is elevated at low temperatures and therefore higher dynamic pressures are to be expected in such a situation. Consideration of the pressure change during the preceding time span likewise allows more accurate/more reliable fault detection to be implemented.

In a refinement of the above-described method, the at least one maximum target value M0 can correspondingly also be predefined in consideration of the ascertained or estimated brake fluid temperature, the ascertained or estimated ambient temperature, and/or the ascertained or estimated pressure change within a time span preceding a check of the isolation valve. Low temperatures or pressure changes during the preceding time span can thus be reliably prevented from resulting in an incorrect fault detection.

The aforementioned methods can furthermore be supplemented with a method step in which a current speed of the vehicle is ascertained or estimated. Preferably, in this case the check of the isolation valve is performed only if the current sped is at least in a range between 1 km/h and 30 km/h, preferably in a range between 5 km/h and 20 km/h. This is advantageous because in the context of a mechanical blockage of the isolation valve, operation of the pump for the pump running time tp can produce a pressure buildup. An undesired brake pressure buildup can thus also occur in at least one wheel brake cylinder of the brake circuit equipped with the isolation valve, with the result that the vehicle becomes undesirably decelerated. At a comparatively low vehicle speed, however, the driver perceives the slight deceleration as minimally disadvantageous. Avoiding a check of the isolation valve with the vehicle at a standstill allows potentially critical situations due to pump operation during the performance of repairs on the vehicle to be excluded. The check of the isolation valve can furthermore be limited to a stable vehicle state.

As an alternative or a supplement thereto, the method can also have a method step in which a displacement travel of a brake actuation element of the vehicle from its initial position and/or an actuation intensity of an actuation of the brake actuation element by a driver of the vehicle are ascertained or estimated. Preferably the check of the isolation valve is then performed only if the displacement travel and/or actuation intensity are equal to zero. It is thereby possible to ensure that the brake actuation element (e.g. a brake pedal) is not being actuated during the check of the isolation valve. It can thus be assumed that the brake master cylinder is hydraulically connected via the breather orifices to the brake fluid reservoir. In addition, the at least one pump of the brake circuit equipped with the isolation valve is not activated in this case.

The methods explained above can be repeated once a predefined time period, a predefined number of braking actions, or a predefined number of ignition cycles have elapsed. The check of the isolation valve can likewise be performed in accordance with one of the aforementioned methods if a residual pressure is ascertained in the brake circuit despite a passive braking system.

What is claimed is:

1. A method for checking an isolation valve of a braking system of a vehicle, comprising:
   operating at least one pump of a brake circuit of the braking system which is hydraulically connected via the isolation valve to a brake master cylinder of the braking system for a predefined pump running time;
   measuring, using a sensor, at least one value regarding a pressure present in the brake circuit; and
   determining, by an electronic device, based on the at least one measured value, whether the isolation valve is mechanically blocked.

2. The method as recited in claim 1, wherein a predefined waiting time is maintained between operating the at least one pump for the pump running time and measuring the at least one value regarding the pressure.

3. The method as recited in claim 2, wherein the at least one measured value is compared with at least one predefined maximum target value and, if the at least one measured value is above the at least one predefined maximum target value, a determination is made that the isolation valve is mechanically blocked.

4. The method as recited in claim 2, wherein at least one of the waiting time and the at least one predefined maximum target value is predefined in consideration of at least one of (i) an ascertained or estimated brake fluid temperature, (ii) an ascertained or estimated ambient temperature, and (iii) an ascertained or estimated pressure change within a time span preceding a check of the isolation valve.

5. The method as recited in claim 3, further comprising:
one of ascertaining or estimating a current speed of the vehicle, wherein the check of the isolation valve is performed only if the current speed is at least in a range between 1 km/h and 30 km/h.

6. The method as recited in claim 3, further comprising:
at least one of (i) one of ascertaining or estimating a displacement travel of a brake actuation element of the vehicle from an initial position. and (ii) one of ascertaining or estimating an actuation intensity of an actuation of the brake actuation element of the vehicle, wherein the check of the isolation valve is performed only if at least one of the displacement travel and the actuation intensity is equal to zero.

7. The method as recited in claim 3, wherein the check of the isolation valve is repeated after one of a predefined time span, a predefined number of braking actions, or a predefined number of ignition cycles has elapsed.

8. The method as recited in claim 3, wherein the check of the isolation valve is performed if a residual pressure is ascertained in the brake circuit despite a passive braking system.

9. A monitoring apparatus for an isolation valve of a braking system of a vehicle, comprising:
a control unit including a processor configured to perform the following:
determine, based on at least one measured signal provided by at least one sensor, whether the isolation valve is mechanically blocked, the at least one measured signal representing a pressure present in a brake circuit of the braking system which is hydraulically connected via the isolation valve to a brake master cylinder of the braking system; and
if the isolation valve is determined to be mechanically blocked, outputting at least one of a control signal and a fault report signal.

10. The monitoring apparatus as recited in claim 9, wherein at least one of (i) a pump control signal is output by the control unit to at least one pump of the brake circuit, the at least one pump being activated by said signal for a predefined pump running time, and (ii) a sensor control signal is output by the control unit, the sensor signal controlling the at least one sensor to measure the at least one measured signal.

11. The monitoring apparatus as recited in claim 10, wherein the control unit is additionally configured to provide a predefined waiting time between the pump running time and the outputting of the at least one sensor control signal.

12. The monitoring apparatus as recited in claim 9, wherein the control unit is additionally configured to compare the at least one measured signal with at least one predefined maximum target value and, if the at least one measured signal is above the at least one predefined maximum target value, to conclude that the isolation valve is mechanically blocked.

13. The monitoring apparatus as recited in claim 9, wherein the monitoring apparatus is part of an electronic stability control system for a braking system of a vehicle.

14. The monitoring apparatus as recited in claim 9, wherein the monitoring apparatus is part of a braking dynamics regulating system for a braking system of a vehicle.

15. The method as recited in claim 1, further comprising:
outputting, by the electronic device, at least one control signal if it is determined that the isolation valve is mechanically blocked; and
controlling, by way of the at least one control signal, at least one electronic control component of the braking system to suppress pump operations in the brake circuit.

16. The method as recited in claim 1, further comprising:
outputting, by the electronic device, at least one control signal if it is determined that the isolation valve is mechanically blocked; and
controlling, by way of the at least one control signal, at least one component of the braking system to dissipate pressure in the brake circuit.

17. The method as recited in claim 1, further comprising:
outputting, by the electronic device, at least one control signal if it is determined that the isolation valve is mechanically blocked; and
activating, by way of the at least one control signal, at least one of a warning lamp, an image display and an acoustic output apparatus.

18. The method as recited in claim 1, further comprising:
outputting, by the electronic device, at least one control signal if it is determined that the isolation valve is mechanically blocked; and
transmitting, by way of the at least one control signal, a radio signal to a repair shop.

19. A method for checking an isolation valve of a braking system, comprising:
one of ascertaining or estimating a current speed of the vehicle; and
performing, only if the current speed is in a range of 1 km/h and 30 km/h, the following:
controlling the isolation valve into an at least partly opened state,
operating at least one pump of a brake circuit of the braking system which is hydraulically connected via the isolation valve to a brake master cylinder of the braking system for a predefined pump running time,
measuring, at a measurement time, at least one measured value regarding a pressure present in the brake circuit using a circuit pressure sensor connected to the brake circuit, and
determining, based on the at least one measured value, whether the isolation valve, which, from a start of the pump running time until the measurement time, is to be in the at least partially opened state, is mechanically blocked in a closed state.

* * * * *